(12) United States Patent
Crook

(10) Patent No.: US 7,644,956 B2
(45) Date of Patent: Jan. 12, 2010

(54) FLEXIBLE DUCT SLEEVE

(76) Inventor: Dale J. Crook, 13745 W. 121st Ter., Olathe, KS (US) 66062

( * ) Notice: Subject to any disclaimer, the term of this patent is extended or adjusted under 35 U.S.C. 154(b) by 149 days.

(21) Appl. No.: 11/025,889

(22) Filed: Dec. 29, 2004

(65) Prior Publication Data

US 2005/0184509 A1 Aug. 25, 2005

Related U.S. Application Data

(63) Continuation of application No. 10/258,077, filed on Oct. 17, 2002, now Pat. No. 6,837,787, which is a continuation of application No. 09/948,783, filed on Feb. 5, 2000, now Pat. No. 6,354,937.

(30) Foreign Application Priority Data

Feb. 5, 2001 (WO) .................... PCT/US01/03637

(51) Int. Cl.
*F16L 13/04* (2006.01)
(52) U.S. Cl. ...................................... 285/114; 285/417

(58) Field of Classification Search ................. 285/23, 285/18, 114, 115, 116, 301; 248/74.4; 454/292; 138/DIG. 8; 24/17 AP, 16 PB
See application file for complete search history.

(56) References Cited

U.S. PATENT DOCUMENTS

| 487,145 A | * | 11/1892 | Gibbons | .................... 24/16 PB |
| 2,847,237 A | * | 8/1958 | Ackerman | ................. 248/74.4 |
| 5,211,602 A | * | 5/1993 | Holmgren | ................... 285/114 |
| 5,782,648 A | * | 7/1998 | Peterson | .................. 24/17 AP |
| 6,065,782 A | * | 5/2000 | Allen, Jr. | ..................... 285/114 |

* cited by examiner

*Primary Examiner*—Aaron M Dunwoody

(57) ABSTRACT

A sleeve assembly (2) for supporting flexible duct (4) includes a frame (6) with first and second frame sections (10*a*, *b*). The frame sections are secured together by fastener subassemblies (8). The sleeve assembly accommodates flexible duct in various angular and straight configurations. The frame can comprise various suitable materials and skeletal or solid-exterior construction. The sleeve assembly is adapted for various installations in air distribution systems of heating, ventilating and air conditioning systems.

4 Claims, 10 Drawing Sheets

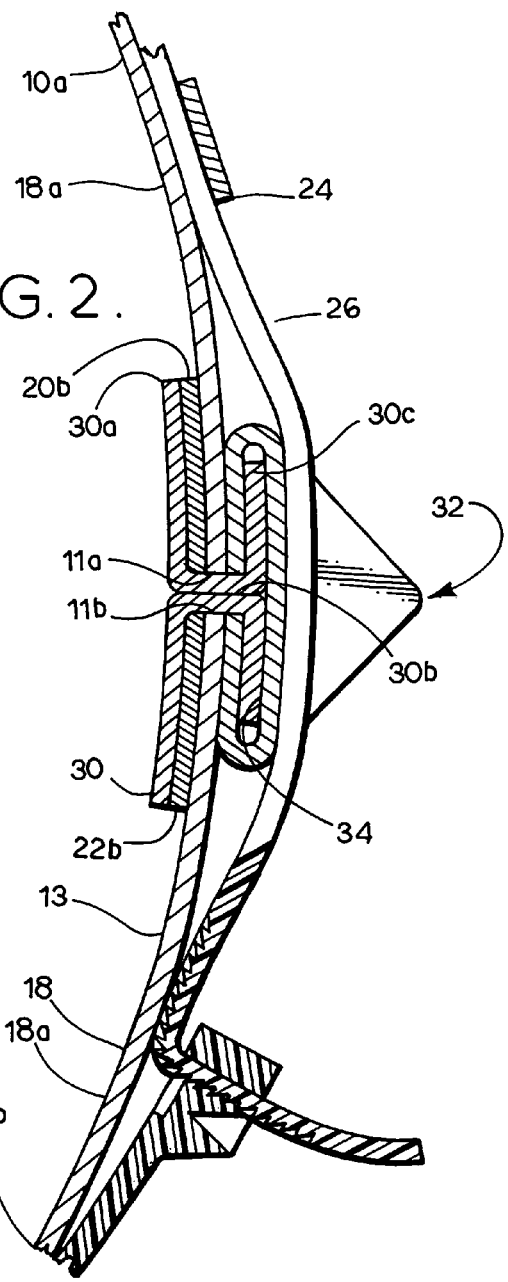
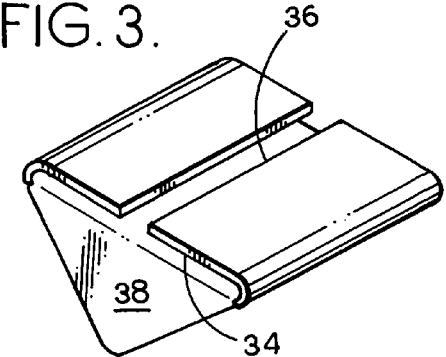
FIG. 3.
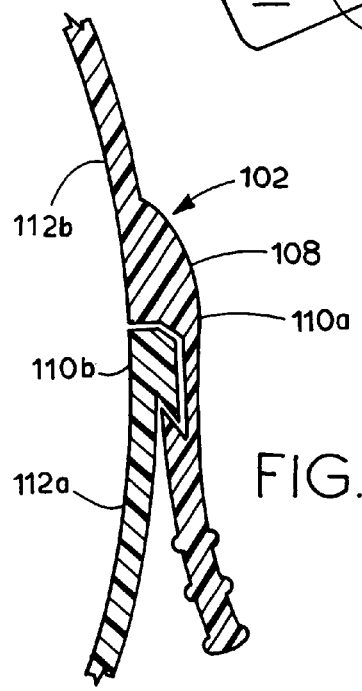
FIG. 4.

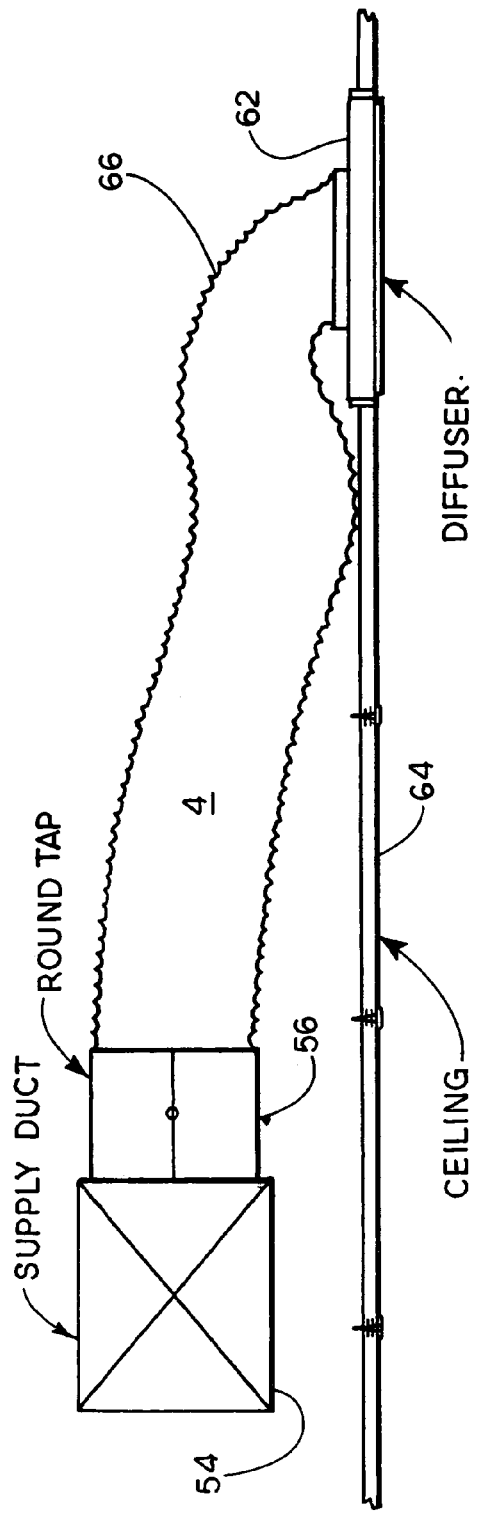
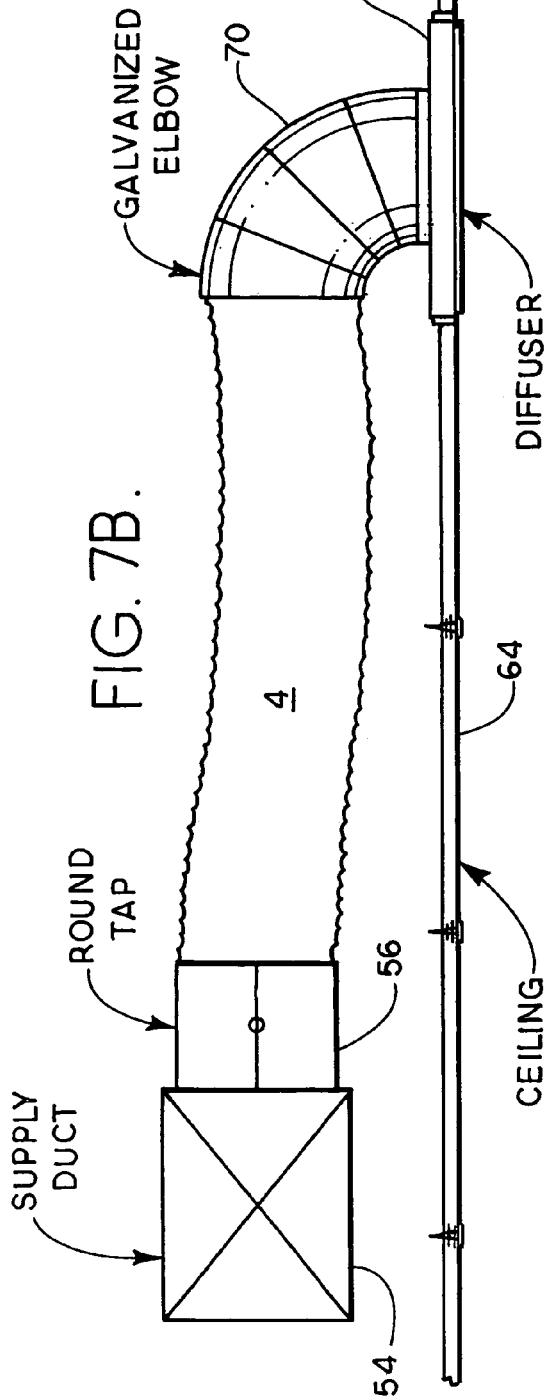
FIG. 7A. PRIOR ART
FIG. 7B.

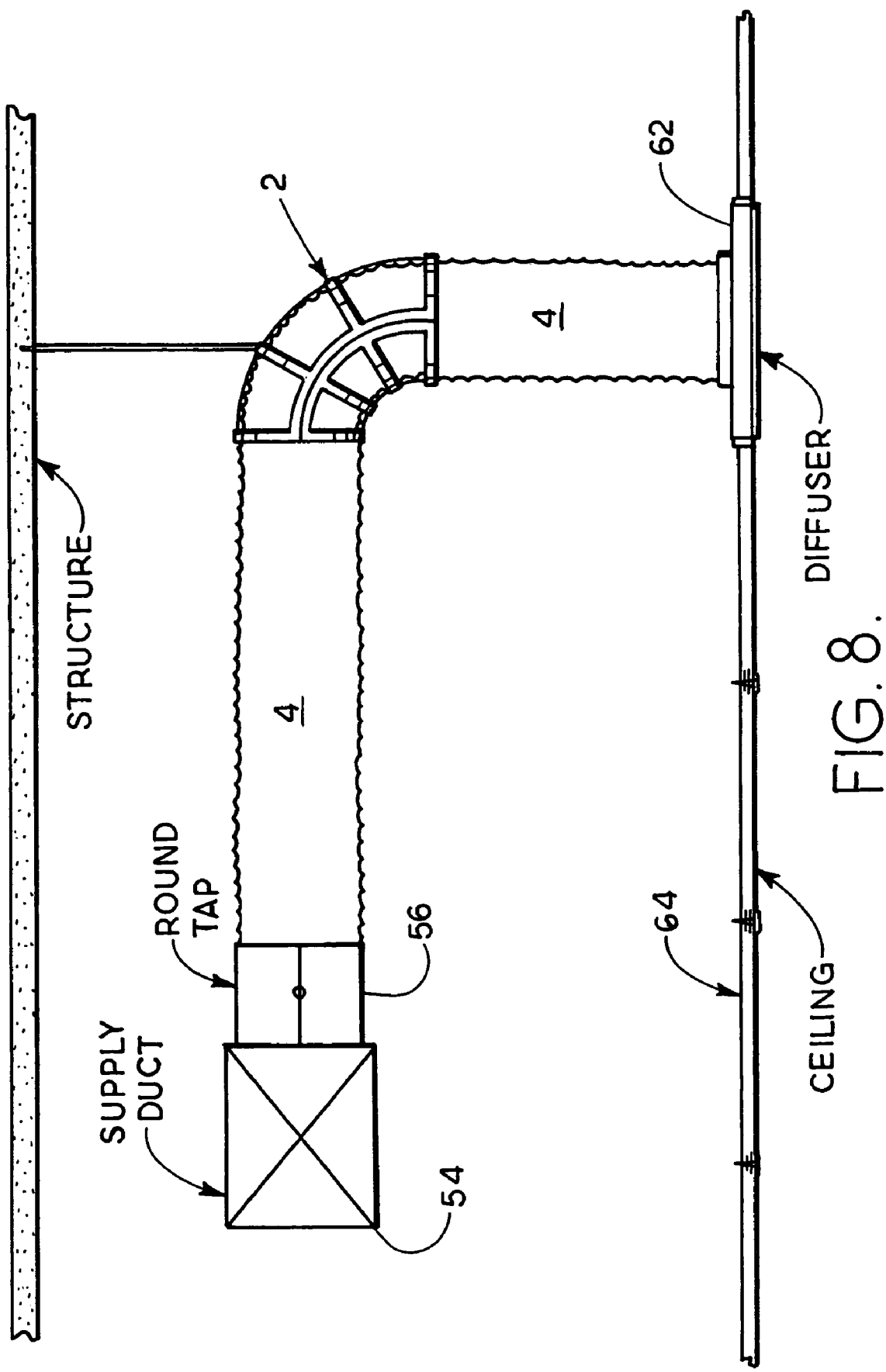

FLEXIBLE DUCT SLEEVE

This is a continuation of U.S. application Ser. No. 10/258,077 filed Oct. 17, 2002 now U.S. Pat. No. 6,354,937, which is a continuation in part of U.S. application Ser. No. 09/498,783 filed Feb. 5, 2000 now U.S. Pat. No. 6,837,787, the disclosures of which are incorporated by reference.

BACKGROUND OF THE INVENTION

1. Field of the Invention

The present invention relates generally to ductwork for heating, ventilating and air conditioning ("HVAC") systems, and in particular to a sleeve for protecting a length of flexible hose from crimping.

2. Description of the Prior Art

Hoses, ducts and conduits in various sizes and configurations are commonly utilized for conveying, routing and directing various substances and objects. In dynamic systems, examples of such substances include air which has been heated or cooled by heating and air conditioning equipment. In the construction industry such systems are commonly referred to as heating, ventilating and air conditioning (HVAC) systems.

Typical HVAC systems include runs of ductwork extending from the heating and air conditioning equipment to additional air handling equipment, or to distribution devices. Additional air handling equipment examples include variable air volume ("VAV") boxes which are located in plenum spaces in many commercial structures. Heated and cooled air is typically introduced into the occupied spaces of buildings by diffusers which direct the airflow in predetermined distribution patterns for maximizing the comfort of the occupants.

Routing ductwork from the air conditioning and heating equipment to the supply diffusers often involves ducting routes which turn, bend and intersect with various components and with other runs of ductwork. To accommodate such curved, angled, and bent routing, flexible duct is commonly used for the final portions of the duct runs, which terminate at diffusers or other components. Flexible duct also has the advantage of being easily reconfigurable to accommodate changed space configurations and the like. Another advantage of flexible duct is that it is available with insulation to avoid condensation during cooling operation.

However, a disadvantage of flexible duct is that it tends to crimp when bent (FIGS. 5a, 6a and 7a). For example, 90° turns into diffusers can crimp unprotected flexible ducts. Crimping tends to restrict air flow and lower overall system efficiency. HVAC equipment thus works harder and consumes more power to overcome flow resistance associated with crimped flexible ducts.

A prior art solution to the problem of flexible duct crimping at diffusers and other bending locations is to install metal elbows, as shown in FIG. 7b. However, such additional components involve additional labor and material costs. Also, insulation may be required and further increase the installation costs.

The present invention addresses these disadvantages of prior art flexible duct installations. Heretofore there has not been available a sleeve for flexible duct with the advantages and features of the present invention.

SUMMARY OF THE INVENTION

In the practice of the present invention, a sleeve assembly is provided for flexible ducts. The sleeve assembly includes a frame comprising first and second frame sections selectively secured together by fastener subassemblies. The frame includes first and second ends and a longitudinal axis extending therebetween. The sleeve assembly can subtend an appropriate angle for supporting a length of flexible duct through a corresponding bend. The frame includes multiple rings formed by ring halves each located in a respective frame section. Each frame section also includes multiple longitudinal members interconnecting respective ribs. The sleeve assembly is adapted for accommodating various applications and installations involving flexible duct, either straight or bent.

OBJECTS AND ADVANTAGES OF THE INVENTION

The principal objects and advantages of the invention include:

providing a sleeve assembly for flexible duct;

providing such a sleeve assembly which reduces crimping in flexible ducts;

providing such a sleeve assembly which enhances air distribution system efficiency;

providing such a sleeve assembly which can accommodate various flexible duct bend configurations;

providing such a sleeve assembly which can be fabricated from various materials;

providing such a sleeve assembly which can eliminate the need for metal elbows in air distribution systems;

providing such a sleeve assembly which can be manufactured from various components; and providing such a sleeve assembly which is economical to manufacture, efficient in operation, capable of a long operating life and particularly well adapted for the proposed uses thereof

BRIEF DESCRIPTION OF THE DRAWINGS

FIG. 2 is an enlarged cross-sectional view thereof taken generally along line 2-2 in FIG. 1.

FIG. 3 is a perspective view of a coupling thereof.

FIG. 4 is an enlarged, cross-sectional view of an alternative construction thereof.

FIG. 7a is a side elevational view of a prior art configuration of the installation shown in FIG. 7, including a crimped flexible hose.

FIG. 7b is a side elevational view of a prior art configuration of the installation shown in FIG. 7, with a galvanized, sheet metal elbow transitioning from a length of flexible duct to a ceiling diffuser.

FIG. 8 is a side elevational view of an installation of the sleeve assembly at a 90° bend of a flexible duct, shown suspended from the underside of a floor slab.

DETAILED DESCRIPTION OF THE PREFERRED EMBODIMENTS

I. Introduction and Environment

Figure 1:
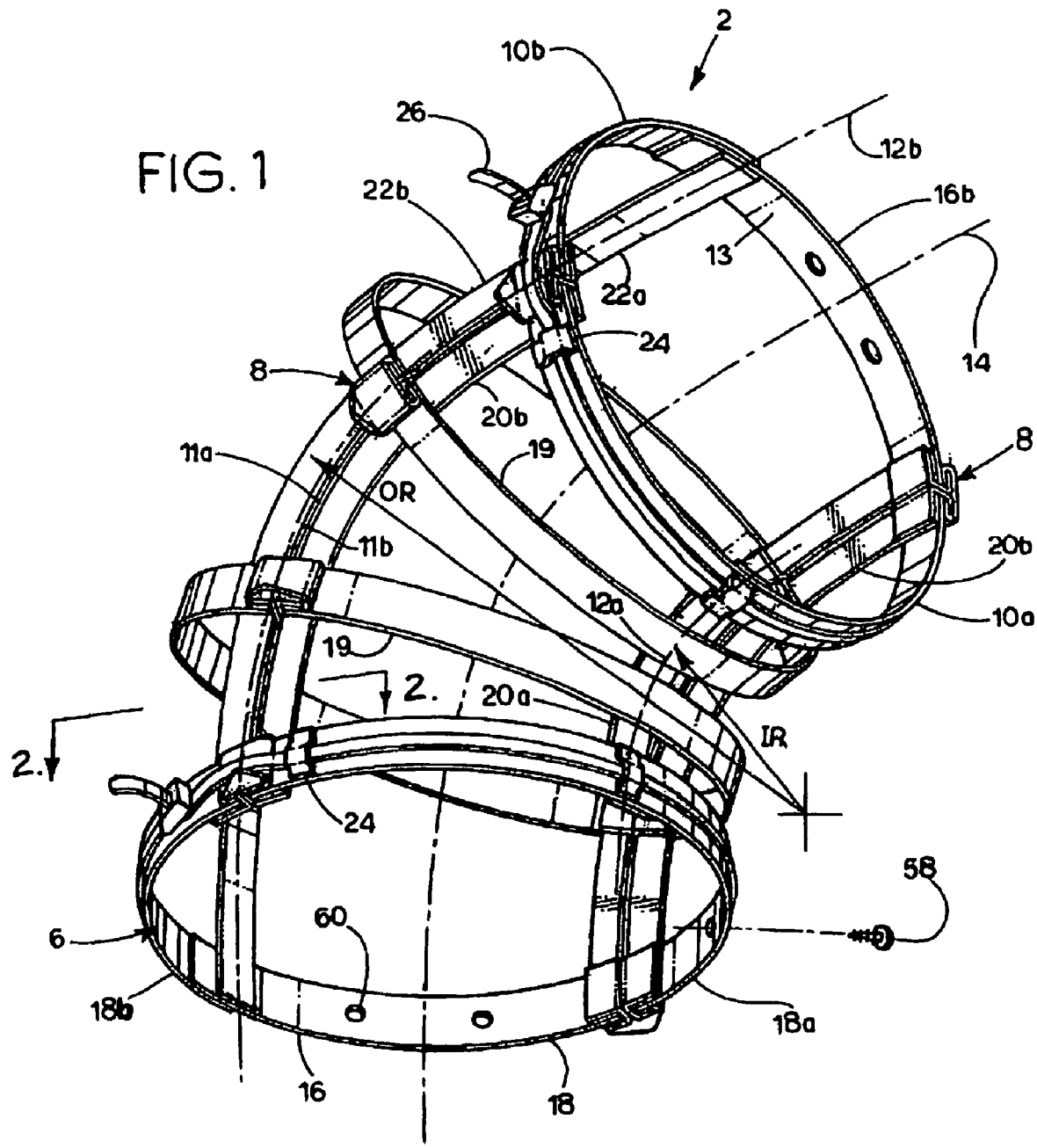
FIG. 1 is a perspective view of a sleeve assembly for a flexible duct embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a sleeve assembly for a flexible member, such as a length of flexible duct 4. Without limitation on the generality of useful applications of the sleeve assembly 2, the flexible duct 4 received in same can comprise a portion of the ductwork in a heating, ventilation and air conditioning ("HVAC") system in a building.

The sleeve assembly 2 generally comprises a skeletal frame 6 secured together by multiple fastener subassemblies 8.

II. Frame 6

The frame 6 comprises first (inner) and second (outer) frame sections 10a,b with an inner radius ("IR") arc 12a and an outer radius ("OR") arc 12b respectively. A longitudinal axis 14 extends between opposite ends 16 of the frame 6 in generally parallel relation to the radius arcs 12a,b. A passage 13 follows the longitudinal axis 14 and receives the flexible duct 4. The frame 6 includes a plurality of annular rings 18 each comprising a pair of ring halves or ribs 18a,b associated with a respective frame section 10a,b. As shown, the frame 6 extends through an arc of approximately 90° and includes four rings 18, two of which are located adjacent to the frame ends 16 and the remaining two of which are located intermediate same whereby the rings 18 are spaced at approximately 30° radial intervals forming gores 19 separated by respective adjacent rings 18.

The inner frame section 10a includes an inside radius longitudinal member 20a and a pair of side longitudinal members 20b which extend in generally parallel relation with respect to the longitudinal axis 14 and interconnect respective ribs 18a. The outer radius frame section 10b includes an outer radius longitudinal member 22a and a pair of side longitudinal members 22b. The rings 18 adjacent to the frame ends 16 include loops 24 mounted thereon in radially-spaced relation for receiving ties 26 which are adapted for securing the frame sections 10a,b together.

III. Fastener Subassembly 8

The frame sections 10a,b are secured together by the fastener subassemblies 8, each of which includes a pair of tabs 30 mounted on respective side edges 11a,b of the frame sections 10a,b. Each tab includes an inner leg 30a, a connector 30b and an outer leg 30c (FIG. 2). As shown in FIG. 2, the tabs 30 can be located at the connections between the ribs 18a and respective longitudinal members 20a,b and 22a,b. With the frame sections 10a,b placed together with their respective side edges 11a,b adjacent to each other, the tab connectors 30b are located adjacent to each other with the tab outer legs 30c projecting outwardly.

Each fastener subassembly 8 further includes a respective coupling 32 with a channel 34 receiving the tab outer legs 30c and a slot 36 receiving the tab connectors 30b. Each coupling 32 includes an extension 38 adapted to be grasped by an installer to facilitate mounting same. The sleeve assembly 2 described thus far can be fabricated of sheet metal stamped and folded into the desired configuration.

IV. Modified Embodiment Sleeve Assemblies

A sleeve assembly 102 comprising a first modified embodiment of the present invention is shown in FIG. 4 and can be molded from plastic or some other suitable material. The sleeve assembly 102 includes a modified fastener subassembly 108 with a first notched latch member 110a integrally formed with a respective first frame section 112b and a second notched latch member 110b integrally formed with a second frame section 112a.

Still further, the sleeve assembly can have a generally tubular configuration which is fully enclosed throughout its entire length with a solid exterior open only at its ends. Such an enclosed or solid exterior configuration could be formed from molded plastic, stamped sheet metal, etc. Sleeve assemblies can be fabricated with various numbers of "gores" 19, which comprise the sections between respective rings. Thus, the frame 6 disclosed has three gores of approximately 30° each whereby the frame 6 subtends an angle of approximately 90° (30°×3=90°). However, other angular configurations and other numbers of gores could be employed to meet the requirements of particular installations.

Moreover, various angles, radii and diameters can be utilized. The material comprising the frame can comprise, for example, plastic, fiber glass, sheet metal, wire, carbon fiber, etc.

Still further, sleeve assemblies can be constructed of multiple chains thereof secured together. Thus, straight pieces could be combined with elbows, and various angular configurations could be assembled from smaller, angle components or elbows.

V. Installations

Figure 5:
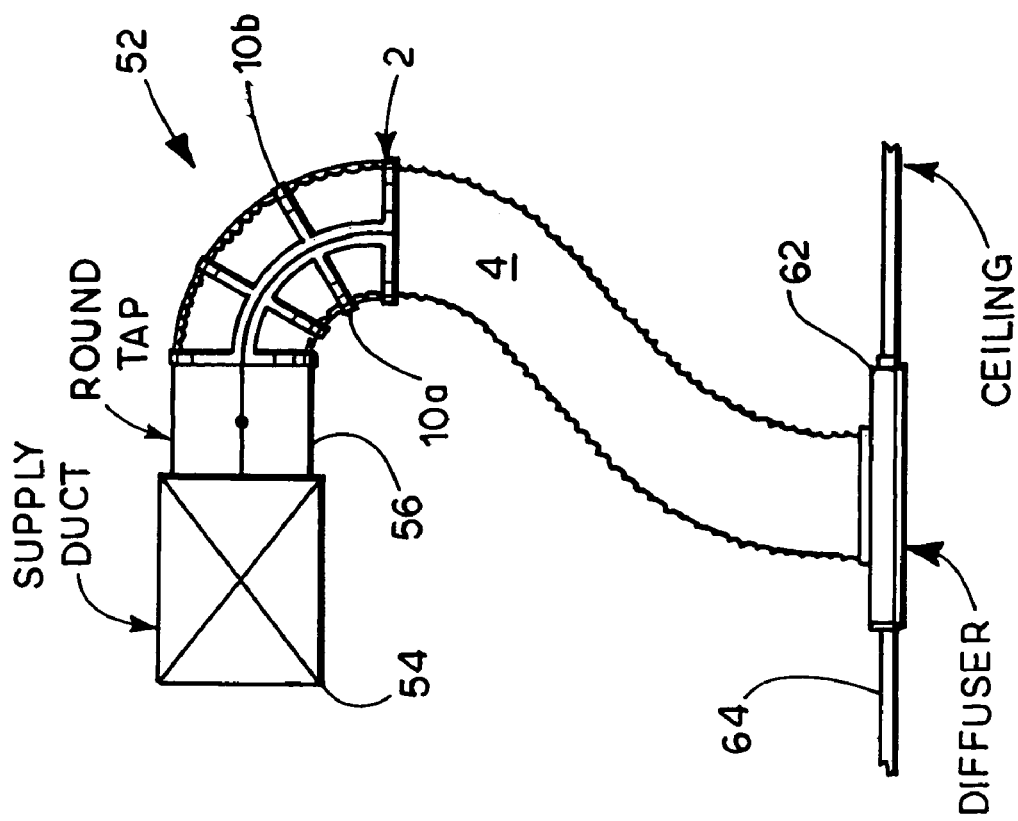
FIG. 5 is a side elevational view of a first installation of the sleeve assembly.

FIG. 5 shows a first installation or application of the sleeve assembly 2 in an HVAC system 52 including a supply duct 54 and a round tap 56 connected to same. The sleeve assembly 2 secures the end of a length of flexible duct 4 to the round tap 56 and supports same through a flexible duct bend 5a. The sleeve assembly 2 can be secured to the flexible duct 4 and the round tap 56 by any suitable means, including mounting screws 58 extending through receivers 60 formed in the rings 18 adjacent to the frame section ends 16. Ties 26 can also be utilized for providing annular constriction of the sleeve assembly 2 on the flexible duct 4 and the round tap 56. The flexible duct 4 extends from the sleeve assembly 2 to a diffuser 62 mounted in a ceiling 64.

Figure 5A:
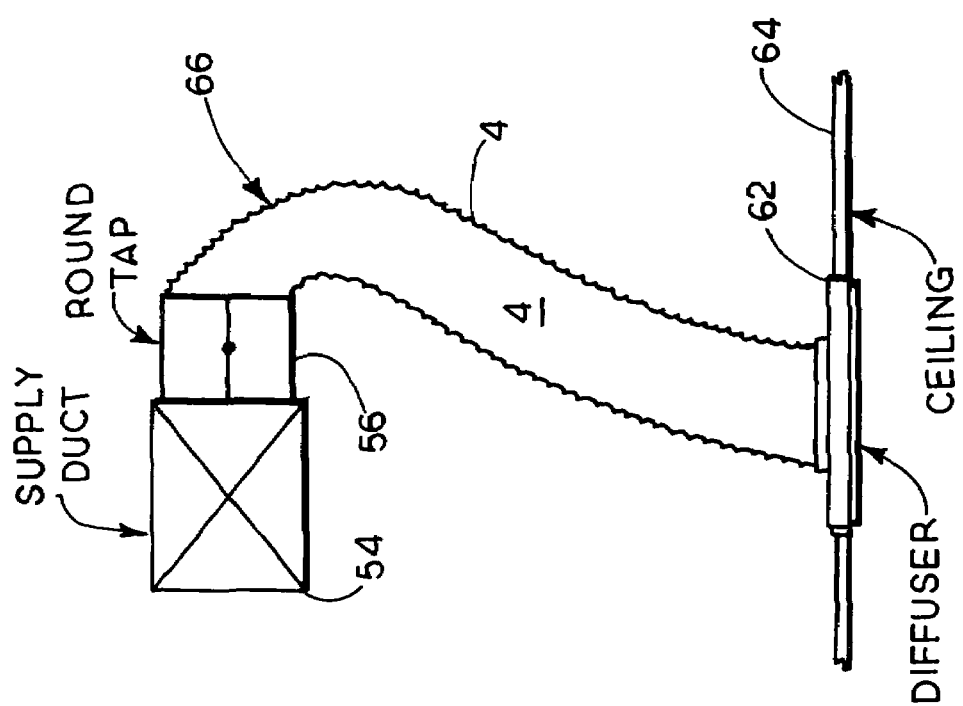
FIG. 5a is a side elevational view of a prior art configuration of the installation shown in FIG. 5.

A prior art configuration is shown in FIG. 5a and illustrates a potential restricted flow choke point 66, which is avoided by the use of a sleeve assembly 2.

Figure 6:
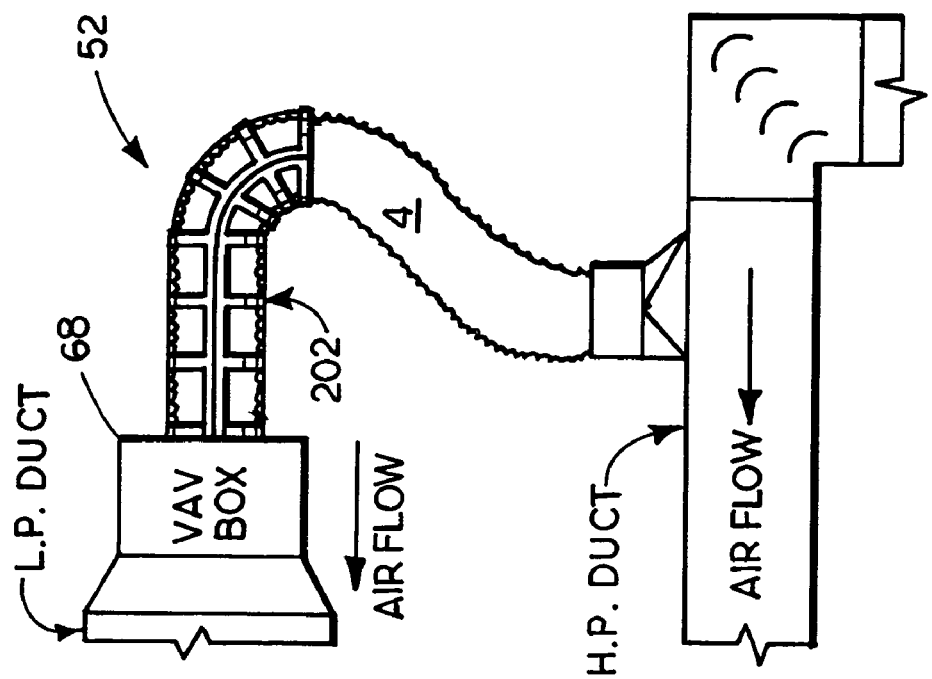
FIG. 6 is a plan view of a second installation of the sleeve assembly.

FIG. 6 shows an installation of a modified, extended length sleeve assembly 202 connecting a length of flexible duct 4 to a variable air volume ("VAV") box 68. The extended length of the sleeve assembly 202 accommodates the operation of the VAV box 68 by providing a relatively straight length adjacent to the VAV box 68 inlet to enable its sensors to perform effectively pursuant to manufacturers' recommendations.

Figure 6A:
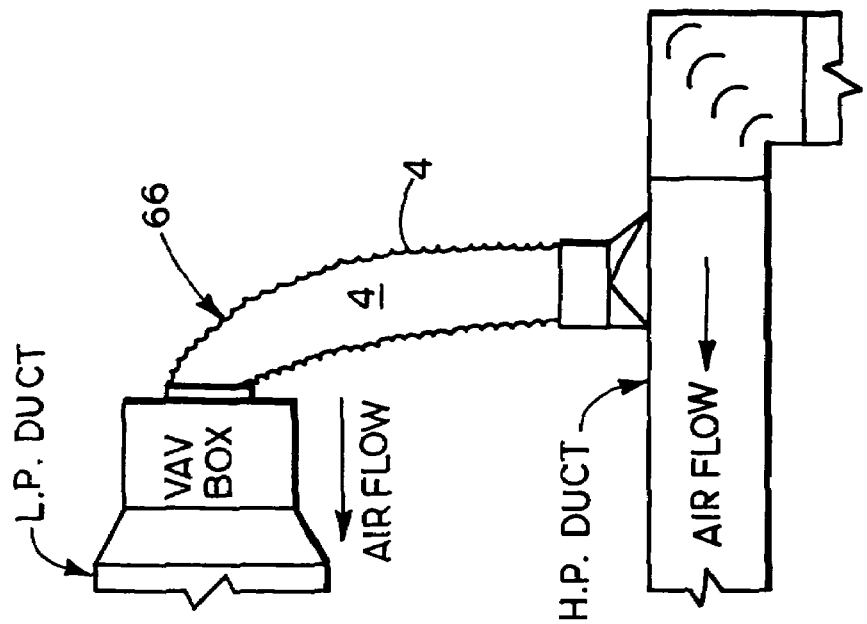
FIG. 6a is a plan view of a prior art configuration of the installation shown in FIG. 6.

FIG. 6a shows a prior art configuration for connecting a length of flexible duct 4 to a VAV box 68 whereby a choke point 66 can occur. Moreover, with the prior art configuration shown in 6a, the necessary uninterrupted straight run from the flexible duct 4 into the VAV box 68 is not accommodated.

Figure 7:
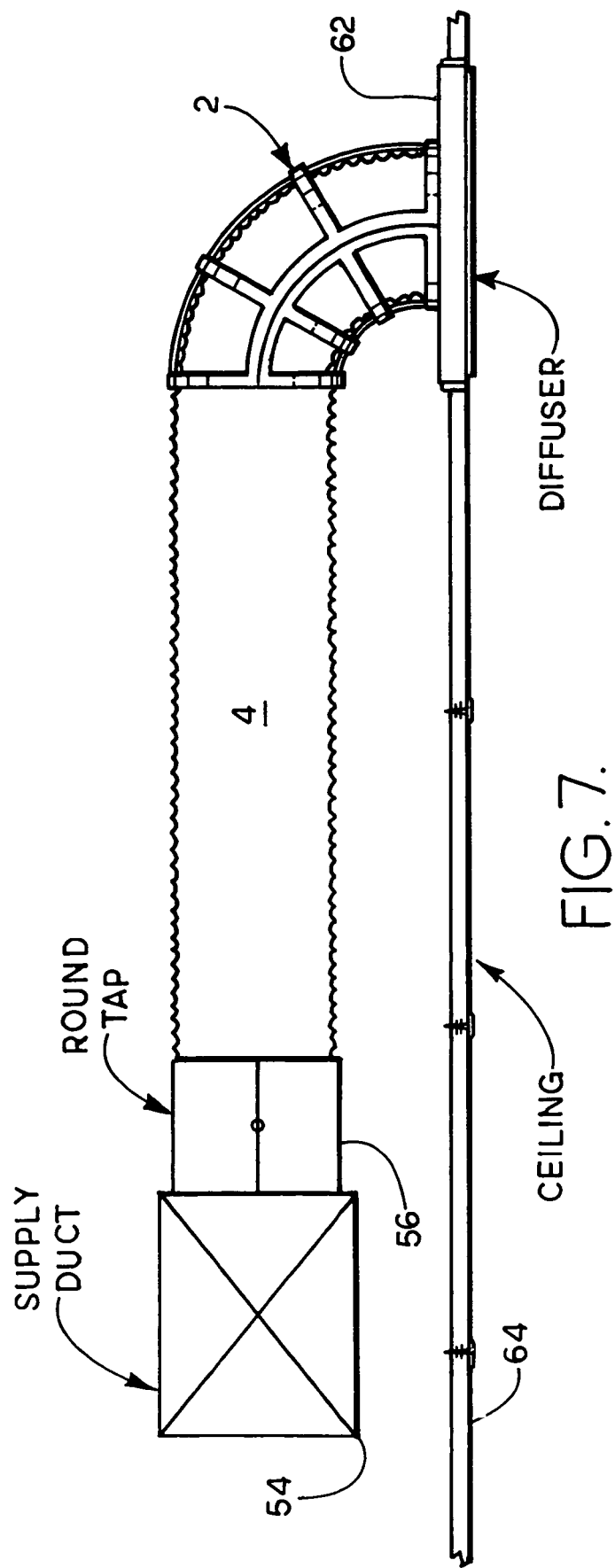
FIG. 7 is a side elevational view of a third installation of the sleeve assembly.

FIG. 7 shows a sleeve assembly 2 coupling a length of flexible duct 4 directly to a diffuser 62. Prior art construction details for this configuration are shown in FIGS. 7a and 7b. FIG. 7a shows the potential choke point 66 which can form if no special consideration is given to maintaining the shape of the flexible duct 4 through a 90° turn as it enters a diffuser 62. FIG. 7b shows a prior art solution to this problem wherein a galvanized elbow 70 is connected to the flexible duct 4 and to the diffuser 62.

FIG. 8 shows another installation of the sleeve assembly 2 for supporting a length of flexible duct 4 at a bend 4a thereof located intermediate a supply duct 54 and a diffuser 62.

VI. Second Modified Embodiment Flexible Duct Sleeve 202

Figure 9:
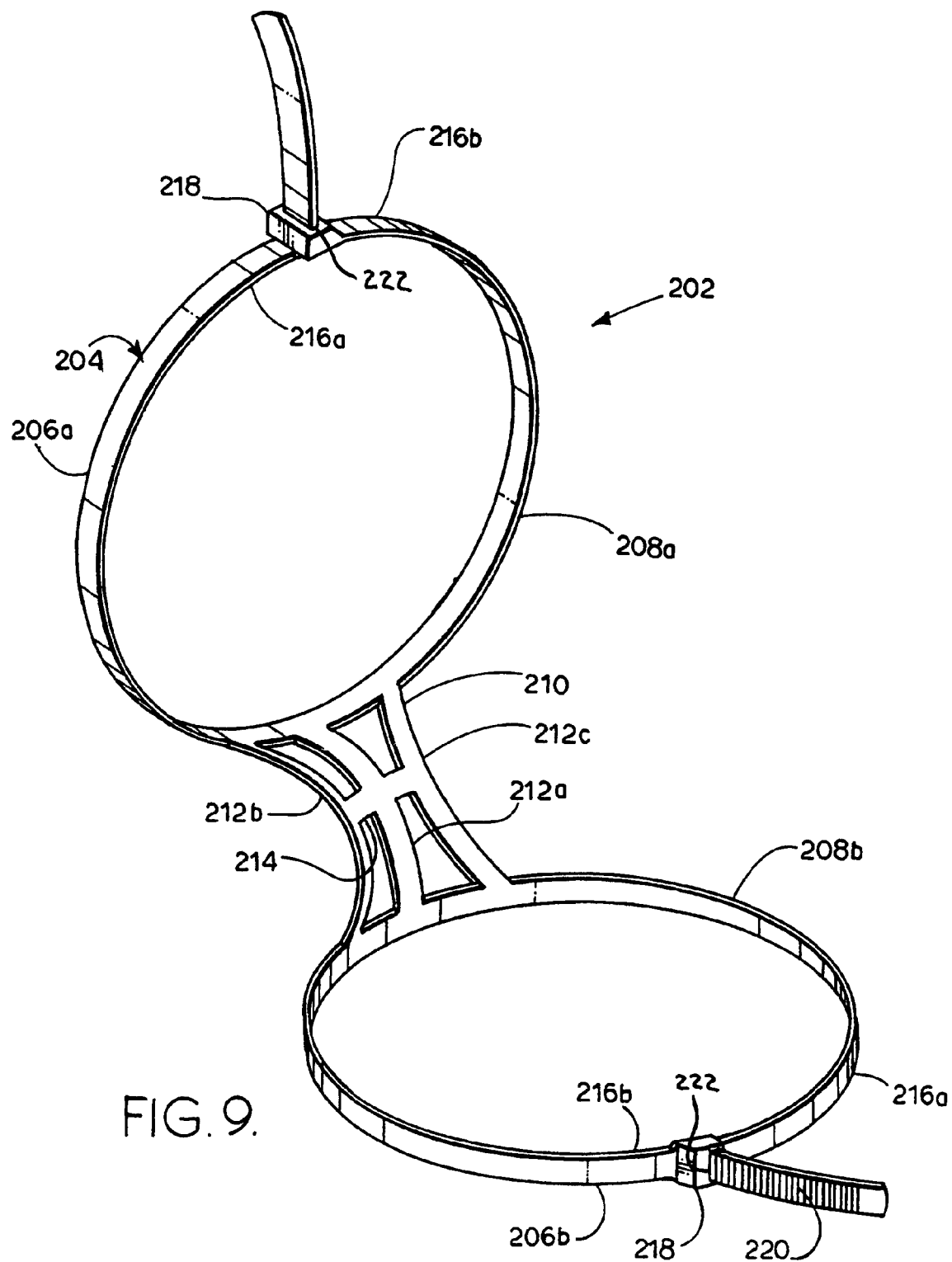
FIG. 9 is a perspective view of a sleeve assembly for a flexible duct comprising a second modified embodiment of the present invention.

A sleeve assembly 202 comprising a second modified embodiment of the present invention is shown in FIG. 9 and generally comprises a frame 204 with first and second ends 206a,b with respective first and second rings 208a,b located thereat. As with the previously-described embodiments, the rings 208a,b lie in planes which are generally perpendicular to an arcuate axis subtending an angle of approximately 90 degrees through the sleeve 202. However, the angular orientation of the rings 208 with respect to each other could fall within a range of suitable angular displacements, ranging from acute angles through obtuse angles.

The rings 208a,b are connected by a spacer subassembly 210 comprising a plurality (3 are shown) of medial and first and second side connecting members 212a, b, c, respectively. The connecting members 212 curve through angles of approximately 90 degrees for maintaining proper spacing and orientation of the rings 208a,b. The connecting members 212 can be provided with ribs for greater stiffness. A spacer cross piece 214 extends between and interconnects the connecting members 212a, b, c. The spacer cross piece 214 is located approximately medially between the first and second rings 208a, b.

Each ring 208a,b comprises first and second sections 216a,b adapted for selective fastening in closed positions whereby the flexible duct is gripped in the passage defined thereby. For this purpose, each ring 208a,b includes a fastener subassembly 218 each comprising a plurality of teeth 220 formed in the ring first section 216a and a receiver 222 formed in the ring second section 216b, similar to the fastener subassembly 8 shown in FIG. 2. The receiver 222 includes a pawl adapted for engaging respective teeth 220 whereby the ring second section 216b is captured by the receiver 222 of the ring first section 216a.

The ratchet-type fastener subassembly 218 shown facilitates quickly and easily tightening the rings 208a,b on the flexible duct 4 without the need for tools or special assembly techniques. Moreover, the fastener subassembly 218 can be released by springing the pawl with a screwdriver or similar tool.

In operation, the sleeve assembly 202 operates in a manner similar to the sleeve assemblies 2 and 102 described above. Installation tends to be relatively efficient and simple because the rings 208a,b comprise essentially the only movable or adjustable component. The bend 4a of the flexible duct 4 can be controlled by properly placing the rings 208a,b when they are cinched down. Thus, the installer can control the relative sharpness or curvature of the bend 4a.

The sleeve assembly 202 can be fabricated from any suitable material using any suitable manufacturing technique. For example, the entire sleeve assembly 202 can be molded from plastic.

VII. Third Modified Embodiment Sleeve Assembly 302

Figure 10:
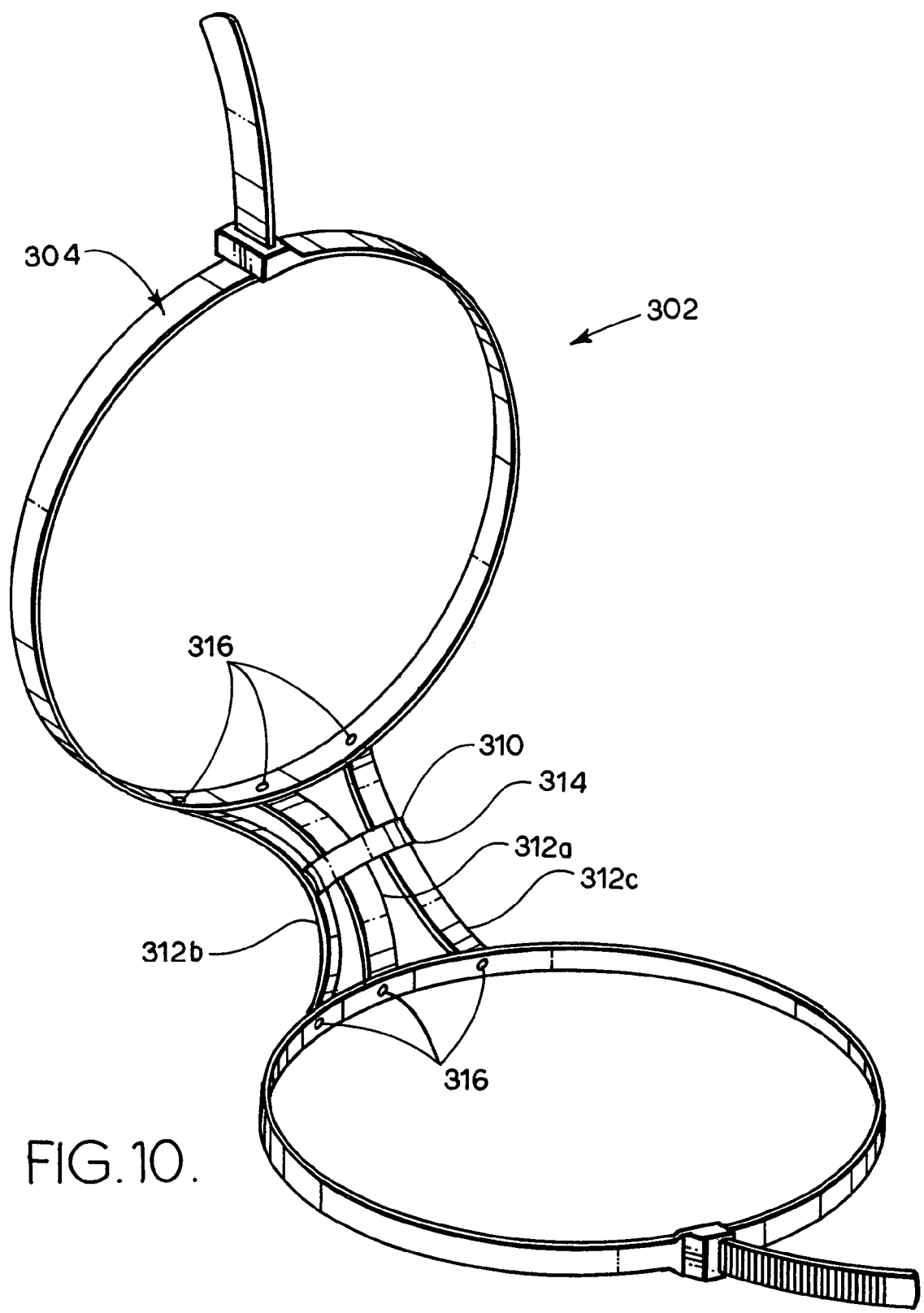
FIG. 10 is a perspective view of a sleeve assembly for a flexible duct comprising a third modified embodiment of the present invention.

A sleeve assembly 302 comprising a third modified embodiment of the presentation is shown in FIG. 10. The sleeve assembly 302 utilizes a construction with sheet metal strips comprising the connecting members 312a,b,c and the spacer crosspiece 314. The rings 308a,b can comprise either sheet metal strips or plastic integrally molded with the spacer subassembly 310. The frame 304 can be secured together by suitable mechanical fasteners 316 such as spot welds, rivets, screws, etc.

VIII. Fourth Modified Embodiment Sleeve Assembly 402

Figure 11:
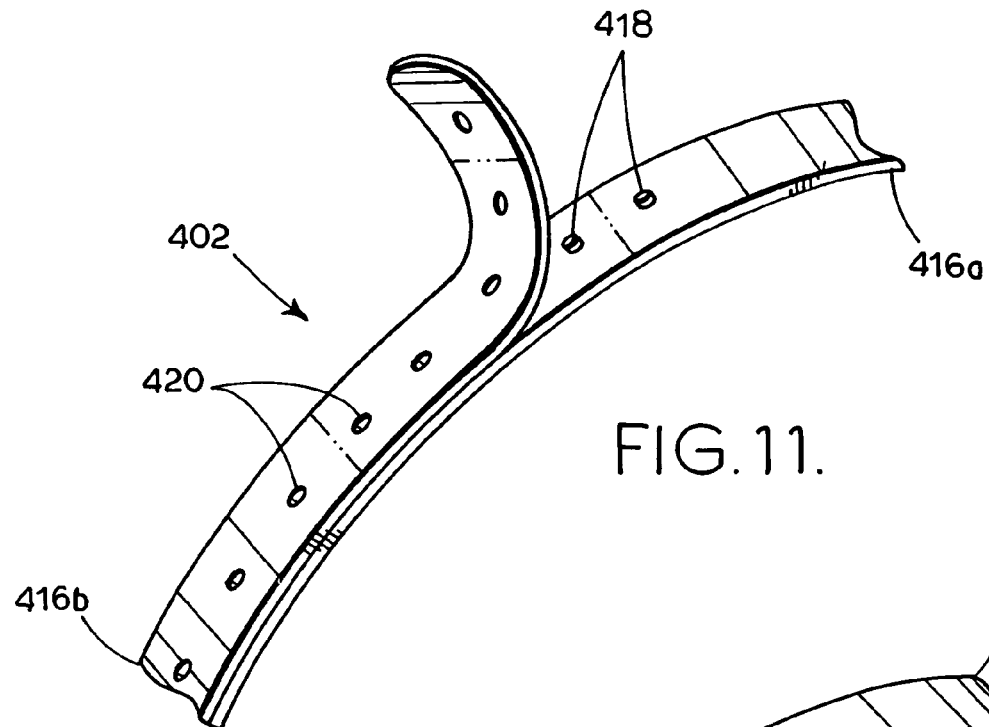
FIG. 11 is a perspective view of a sleeve assembly for a flexible duct comprising a fourth modified embodiment of the present invention with a modified fastener subassembly.

A sleeve assembly 402 comprising a fourth modified embodiment of the present invention is shown in FIG. 11 and includes a frame similar to frame 304 described above with first and second rings 408a,b. Each ring 408a,b includes first and second sections 416a,b. The first ring section 416a includes a plurality of posts 418 each adapted to be received in a respective hole 420 formed in the second section 416b. The posts 418 are adapted for snapping into respective holes 420. It will be appreciated that one or more of the post-hole combinations can be releasably engaged.

In operation, the sleeve assembly 402 is otherwise substantially similar to the sleeve assemblies 2, 102, 202, and 302 described above.

IX. Fifth Modified Embodiment Sleeve Assembly 502

Figure 12:
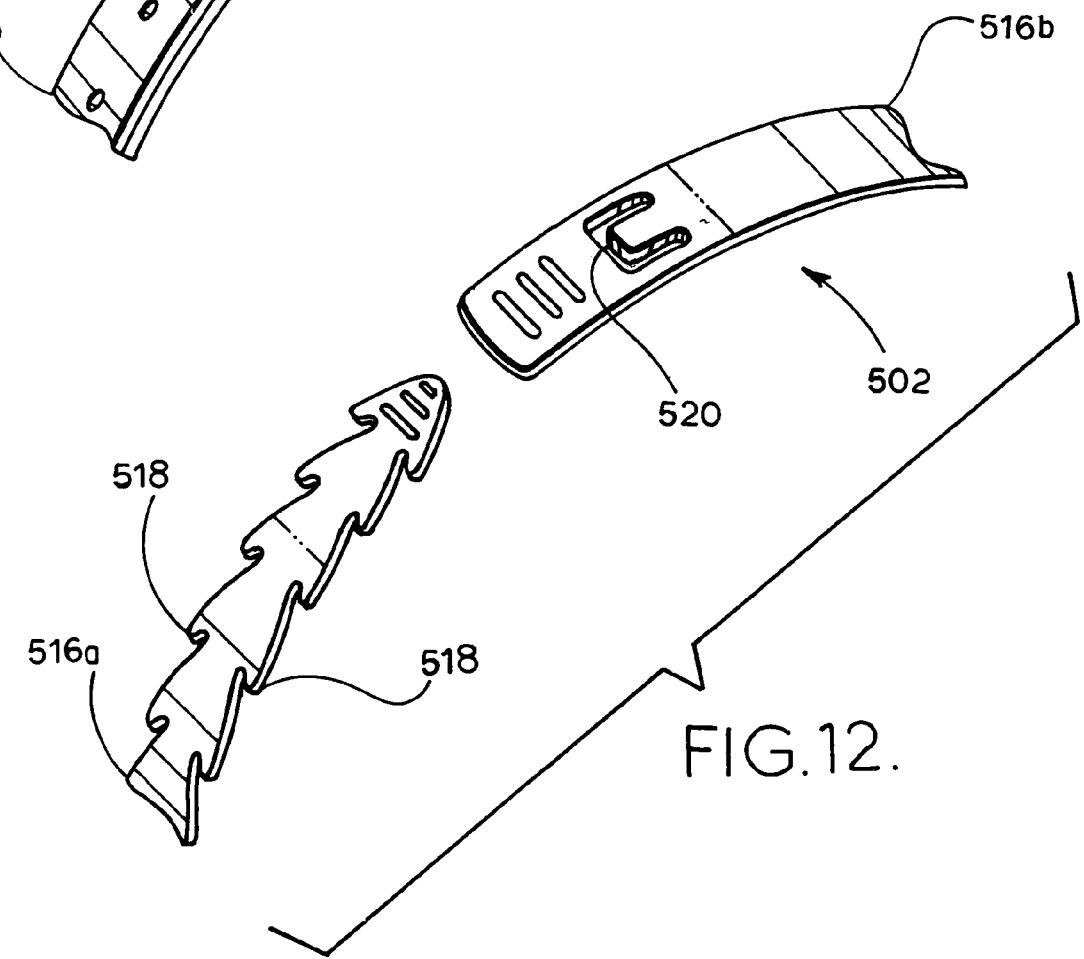
FIG. 12 is a perspective view of a sleeve assembly for a flexible duct comprising a fifth modified embodiment of the present invention with a modified fastener subassembly.

A sleeve assembly 502 comprising a fifth modified embodiment of the present invention is shown in FIG. 12. The sleeve assembly 502 generally comprises a frame similar to those described above, except that each first ring section 516a includes sawtooth edges 518 and each second ring section 516b includes a slot 520. The slot 520 removably receives the end of the first ring section 516a whereby the sawtooth edges 518 engage the other ring section 516b within the slot 520 thereof for capturing the ring section 516a within the slot 520 of the second ring section 516b, whereby the rings are secured in predetermined configurations for clamping the flexible duct 4.

What is claimed and desired to be secured by Letters Patent is as follows:

1. A sleeve assembly for use on flexible ducts, where the sleeve assembly comprises:
   a) a frame including
      i) opposite first and second ends;
      ii) an inner radius arc extending between said ends;

iii) an arcuate longitudinal axis extending between said ends in generally parallel relation with respect to said arc;
iv) a first and second annular ring, each said ring lying generally in a plane perpendicular to said longitudinal axis;
v) a passage extending between and open at said ends, said passage capable of receiving a length of flexible ducting
vi) each said ring including first and second sections
viii) each said ring includes a fastener subassembly for selectively joining said sections of each respective ring together;
ix) each said ring being attached to an adjacent ring by a first and second side longitudinal member which extend in generally parallel relation with respect to said longitudinal axis and interconnect said rings with said fastener subassembly.

2. The sleeve assembly of claim 1, which includes:
a) said fastener subassemblies each comprising teeth formed in one of said sections and an interlocking ratchet formed in the other said section, said teeth and said ratchet selectively engaging to secure said sections together.

3. The sleeve assembly of claim 1, wherein each said fastener subassembly includes a plurality of posts formed on one of said sections and a plurality of holes formed in the other said section, said holes selectively receiving said posts.

4. The sleeve assembly of claim 1, wherein said fastener subassembly includes:
a) said first section having opposite sawtooth edges; and b) said second section including a slot selectively receiving said first section and adapted for retaining said first section sawtooth edges therein.

* * * * *